United States Patent [19]
Sasaki et al.

[11] Patent Number: 5,179,845
[45] Date of Patent: Jan. 19, 1993

[54] HEAT EXCHANGER

[75] Inventors: Kenichi Sasaki, Isesaki, Japan; Janusz Sokolowski, Garland, Tex.

[73] Assignee: Sanden Corporation, Gunma, Japan

[21] Appl. No.: 717,476

[22] Filed: Jun. 19, 1991

[51] Int. Cl.⁵ .............................................. F25B 39/02
[52] U.S. Cl. ...................................... 62/515; 165/150; 165/173
[58] Field of Search ................... 62/515; 165/150, 173, 165/174

[56] References Cited

U.S. PATENT DOCUMENTS

| | | | |
|---|---|---|---|
| 2,707,868 | 10/1955 | Goodman | 165/150 |
| 2,816,738 | 12/1957 | McElgin | 165/150 |
| 2,991,978 | 7/1961 | Jones | 165/150 |
| 4,172,496 | 10/1979 | Melnyk | 156/150 |
| 4,244,194 | 1/1981 | Haesters et al. | 62/515 |
| 4,549,605 | 10/1985 | Sacca et al. | 165/150 |
| 4,914,929 | 4/1990 | Shimazaki | 62/515 |
| 4,962,811 | 10/1990 | Yamamoto | 165/150 |
| 4,966,230 | 10/1990 | Hughes et al. | 165/150 |

*Primary Examiner*—Ronald C. Capossela
*Attorney, Agent, or Firm*—Baker & Botts

[57] ABSTRACT

A serpentine type evaporator for use in a refrigeration circuit, which comprises a serpentine flat tube including a plurality of spaced essentially parallel planar portions and a plurality of bent portions, fins interposed between opposed outer surfaces of the serpentine flat tube, an inlet header pipe connected to one end of the serpentine flat tube, an inlet pipe connected to the inlet header pipe, an outlet header pipe connected to the other end of the serpentine flat tube, and an outlet pipe connected to the outlet header pipe. At least one of the inlet pipe and the outlet pipe are connected perpendicularly to one of said inlet header pipe or the outlet header pipe.

12 Claims, 10 Drawing Sheets

HEAT EXCHANGER

BACKGROUND OF THE INVENTION

1. Technical Field

This invention relates to heat exchangers for refrigeration circuits, and more particularly, to an evaporator for an automotive air conditioning refrigeration circuit.

2. Description Of The Prior Art

Evaporators for use in automotive air conditioning refrigeration circuits are known in the art. With reference to FIG. 1, a serpentine type evaporator or heat exchanger 10 is shown. Evaporator 10 includes a continuous serpentine flat tube 11 through which refrigerant fluid flows. Serpentine tube 11 includes a plurality of spaced parallel planar portions 12 and a corresponding plurality of bent portions 121. Air flows through evaporator 10 between planar portions 12 in the direction of the arrow shown in FIG. 1. As shown in FIG. 2, the interior space of serpentine tube 11 is divided by a plurality of parallel partition walls 111 into a corresponding plurality of essentially parallel passages through which refrigerant fluid flows. One terminal end of serpentine tube 11 is brazed to fluid inlet header pipe 17 which is connected to an inlet pipe 15. The opposite end of inlet pipe 15 is connected to an expansion means (not shown) of a refrigeration circuit. A second terminal end of serpentine tube 11 is brazed to fluid outlet pipe 16. Outlet pipe 16 is connected to a compressor which provides suction for causing the refrigerant fluid to flow through the circuit. Refrigerant fluid is supplied to serpentine tube 11 from the expansion means via inlet pipe 15, flows through each successive planar portion 12 and bent portion 121 towards outlet pipe 16, and is then returned to the compressor. Of course, the refrigeration circuit may include other elements disposed between the compressor and evaporator 10.

Evaporator 10 further includes corrugated heat receiving metal sheets or fin units 13 disposed between opposed planar portions 12. Fin units 13 are fixed to planar portions 12 by brazing along the lines of contact. Protective side plates 14 are fixed to the exterior side of each of the outside fin units 13.

As seen from the evaporator shown in FIG. 1, the inlet pipe 15 extends form the front side to the rear side of the evaporator and then joins to the header pipe 17 at its back end. This kind of u-shaped inlet tube bending is called a return-bend. This piping structure provides a so-called counter flow between the refrigerant fluid flow and an air flow so that an effective heat transfer can be obtained in the evaporator.

There is another prior art evaporator shown in FIG. 3 which is a so called fin and tube evaporator 30. Evaporator 30 includes an inlet pipe 31, and outlet pipe 32, fins 33 and connection tubes 34 which extends between U-shaped pipes 35. The refrigerant fluid flows from the inlet pipe 31 through tubes 34 and the U-shaped pipes 35 and into the outlet pipe 32. As compared with evaporator 10 shown in FIG. 1, the inlet pipe 31 and the outlet pipe 32 shown in FIG. 3 are connected to the evaporator 30 along one side. In this construction no space is taken in the front or rear of the evaporator. This space factor is an advantage of the fin and tube evaporator over a serpentine type evaporator. Due to this difference in inlet and outlet connections, difficulty has been encountered in installing a serpentine type evaporator into an air conditioner cooling case originally designed to accommodate a fin and tube evaporator.

SUMMARY OF THE INVENTION

It is an object of this invention to provide a serpentine type evaporator having its inlet and outlet pipes connected to a side of the evaporator.

It is another object of this invention to provide a serpentine type evaporator having an outlet pipe connected to the evaporator from the side or front thereof.

Another object o this invention is to provide a serpentine type evaporator having its inlet pipe connected to the side or back thereof.

An evaporator in accordance with the present invention includes a serpentine flat tube through which refrigerant fluid flows. The serpentine flat tube includes a plurality of parallel planar portions and a corresponding plurality of curved portions linking the planar portions to form a continuous serpentine tube. At least one corrugated metal heat receiving sheet or fin unit is fixedly disposed between opposed parallel planar portions of the tube. The inlet pipe is connected to the inlet header pipe from either the rear or side of the evaporator. The outlet pipe is connected to the evaporator from either the front or side of the evaporator.

DETAILED DESCRIPTION OF THE PREFERRED EMBODIMENT

Figure 4:
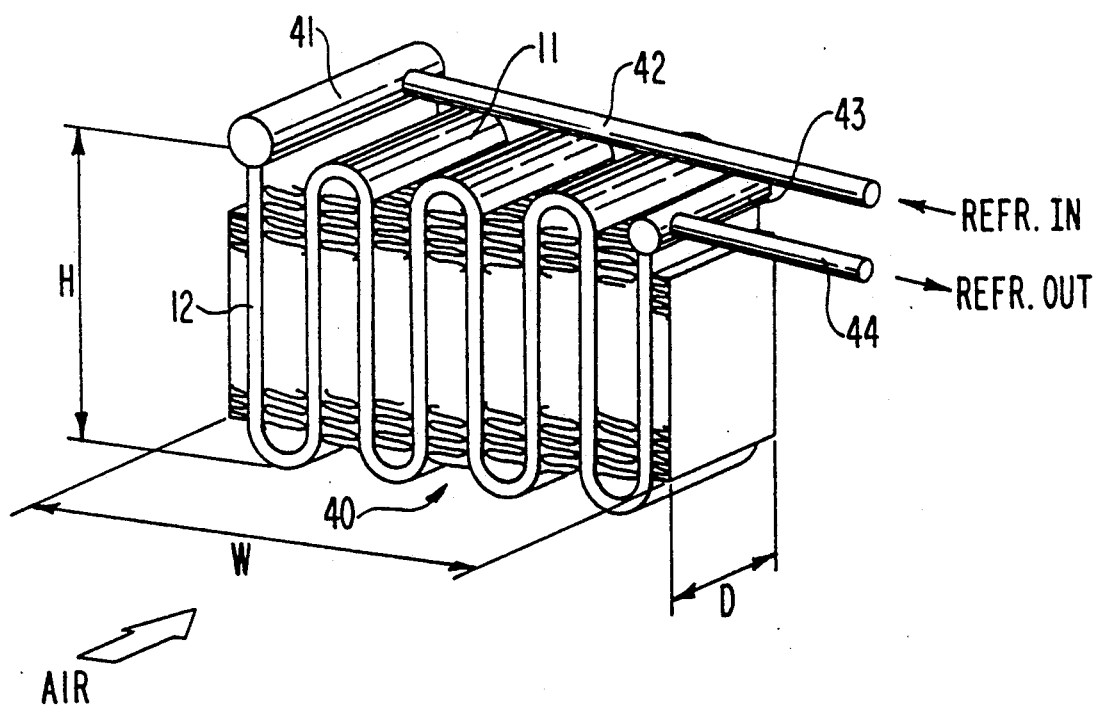
FIG. 4 is a perspective view of a serpentine type evaporator according to the present invention.

An evaporator 40, shown in FIG. 4, includes an inlet header pipe 41. Header pipe 41 is preferably a clad aluminum tube consisting of, for example, AA3003 with AA4045 clad on the inside thereof. The header pipe may be of the type which is clad on the outside or on both sides. In addition, other aluminum material combinations can also be used. Inlet pipe 42 has one end which is inserted into and brazed to header pipe 41 in a brazing furnace. Alternatively, the inlet pipe 42 may be connected by torch brazing or welding. Outlet header pipe 43 is preferably comprised of the same material as the inlet header pipe 41. Outlet pipe 44 is brazed to the outlet header pipe by the same methods described above for attaching the inlet header pipe. The inlet pipe 42 and the outlet pipe 44 extend horizontally toward a side direction of the evaporator 40 and do not occupy any space in the front or rear of the evaporator.

As shown in FIG. 4, the inlet pipe 42 is connected to the header pipe 41 in the back part thereof and in a perpendicular direction to the direction of planar portion 12 of flat tube 11. The outlet pipe 44 is connected to the header pipe 43 in the front part thereof. These connections are the main characteristics of the present invention.

Figure 1:
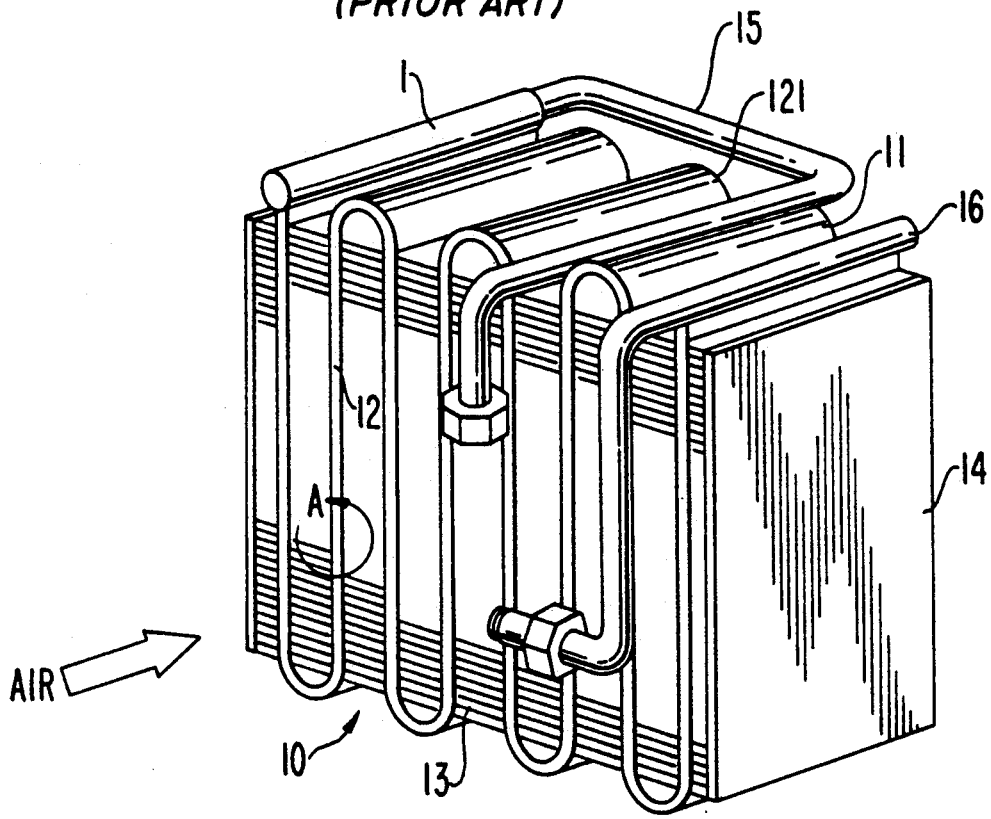
FIG. 1 is a perspective view of a prior art serpentine type evaporator for use in an automotive air conditioning refrigeration circuit.

The prior art evaporator 10 shown in FIG. 1 includes an inlet pipe 15 connected to header pipe 17 from the rear side and an outlet pipe 16 connected to (or forming) a header pipe from the front side. According to this structure, a larger amount of refrigerant flows into a front part of the passageways in the flat tube, as compared with refrigerant which flows in the back part of the passageway. This flow distribution gives a better heat transfer between the refrigerant flow and air flow.

Figure 2:
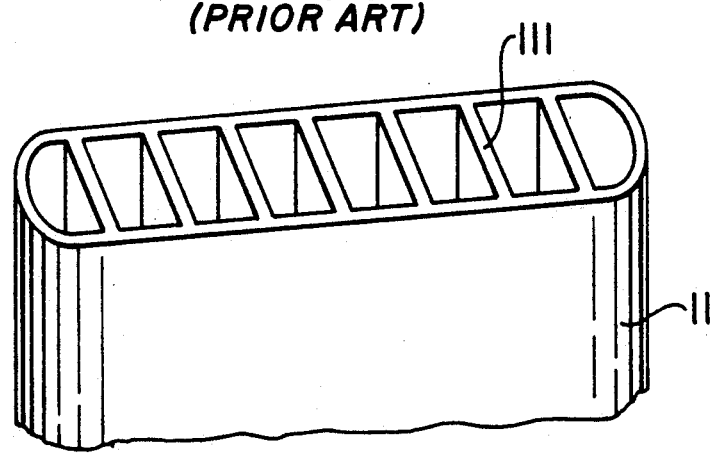
FIG. 2 is an end view of the serpentine tube shown in FIG. 1.
Figure 3:
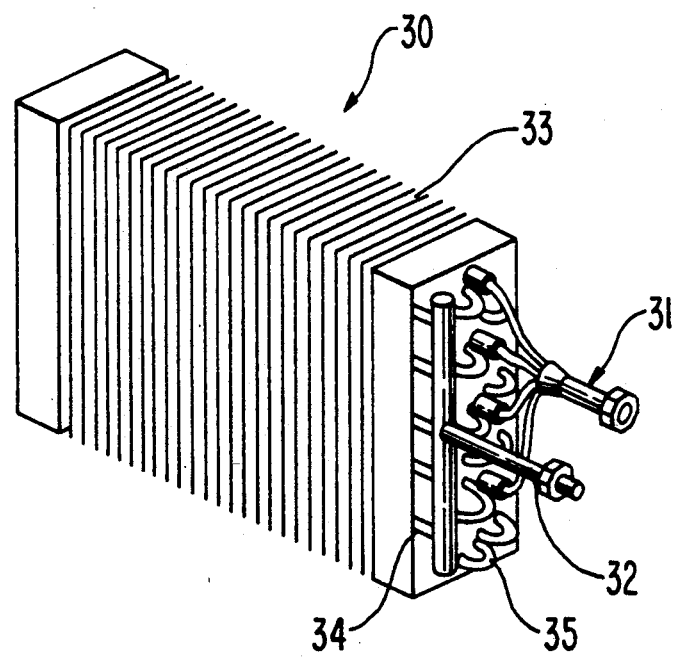
FIG. 3 is a perspective view of a prior art fin and tube type evaporator.

At first, as a preliminary test, the inventors made an evaporator similar to the evaporator 40 shown in FIG. 4, without outlet pipe 43 and header the pipe 44. This construction caused one end of the planar portion 12 to be exposed to the air, such as shown in FIG. 2. A fluid was supplied into the inlet pipe 42 to visualize the fluid flow distribution at the other end of the flat tube. According to this preliminary testing, a larger amount of fluid flowed in the passageways in the front part of the flat tube 11.

Secondly, the inlet pipe 42 was connected at the center of the inlet header pipe 41. In this arrangement the fluid flow in the front part was reduced, to produce a more even flow across the passageways.

Next, the inlet tube 42 was connected to the header pipe 41 in the vertical direction at the top of and in the back part of the header (not shown). In this testing, there was a larger amount of fluid flowed straight into a part of the passageways facing the end of the inlet pipe 42 connected into the header 41.

These tests suggested that the best location for getting the counter-flow in the evaporator would be for the inlet pipe 42 to be connected to the header pipe 41 in horizontal or perpendicular direction to the planar portion of the flat tube and in the back part of the header pipe 41.

The location of the outlet tube 42 connection to the outlet header 43 is in the front part thereof. (FIG. 4) This location helps to keep the counter-flow.

Figure 5:
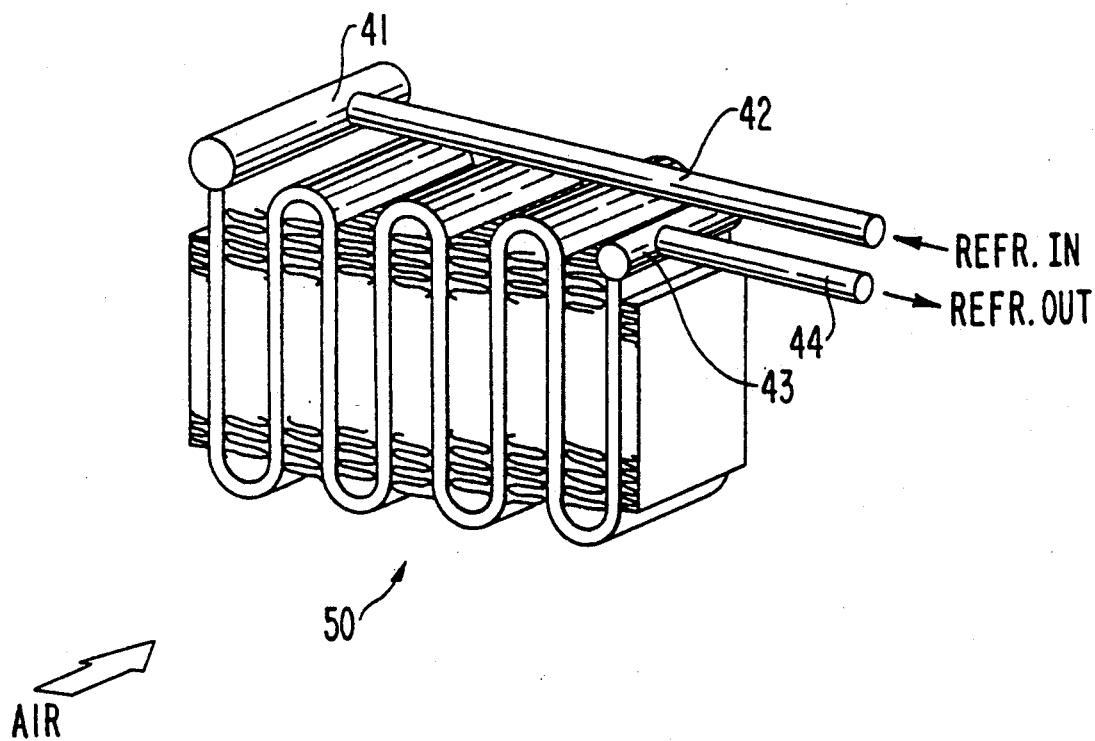
FIG. 5 is another embodiment of the evaporator according to the present invention.

FIG. 5 shows another embodiment of the evaporator 50 with the outlet pipe 44 connected at the middle of the header pipe 43.

Figure 6:
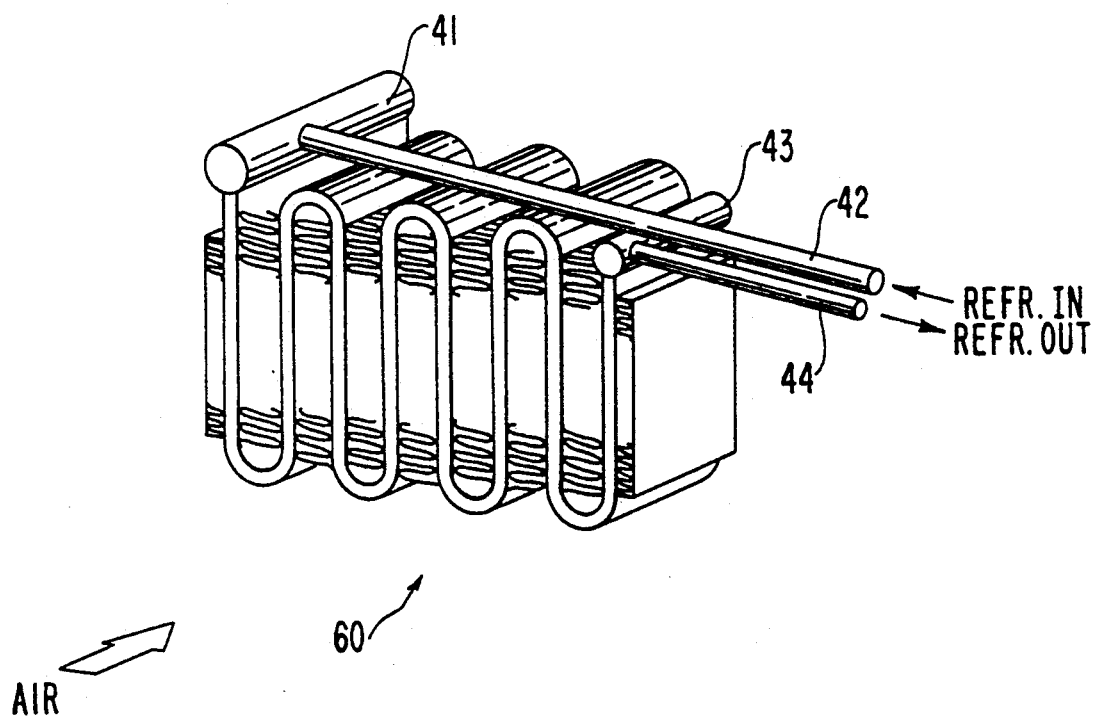
FIGS. 6 through 10 are other embodiments of the present invention, respectively, according to the present invention.

FIG. 6 shows another modification of the evaporator 60, where the inlet tube 42 is connected to the middle of the inlet header 41.

Figure 7:
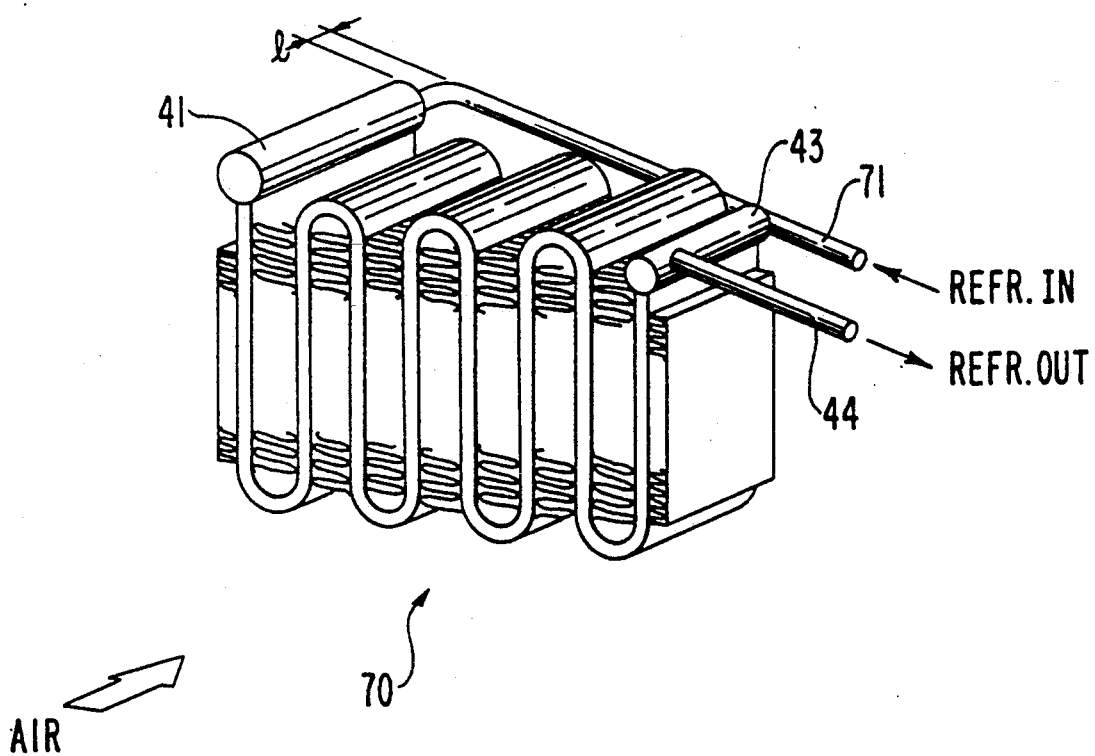

FIG. 7 is another example of the evaporator of the present invention, where the inlet tube 71 is connected to the header pipe 41 from the rear of the evaporator 70 to create a proper counter flow. As shown by "1" in the drawing, the inlet pipe 71 occupies the rear space of the evaporator. Distance "1" depends on the diameter of the inlet pipe 71 (usually ½" or 12.7 mm) and the bending radius thereof. The side mounting of the inlet and outlet pipes makes evaporator 70 better than evaporator 10.

The following Table shows cooling capacity comparisons of evaporators shown in FIGS. 1, 4, 5, 6 and 7.

The size of the evaporator cores is each 190 mm height × 225 mm wide and 80 mm depth. All of the evaporator cores have the same size.

TABLE

| EVAPORATOR COOLING CAPACITY COMPARISON | | | | | |
| --- | --- | --- | --- | --- | --- |
| SAMPLES | COOLING CAPACITY W | AIR FLOW [CMH] | | | |
| | | 250 | 300 | 350 | 400 |
| EVAPORATOR A | Q [W] | 3890 | 4264 | 4584 | 4867 |
| (of FIG. 1) | (%) | (100) | (100) | (100) | (100) |
| EVAPORATOR B | Q [W] | 3978 | 4563 | 4997 | 5223 |
| (of FIG. 4) | (%) | (102) | (107) | (109) | (107) |
| EVAPORATOR C | Q [W] | 4005 | 4500 | 5003 | 5448 |
| (of FIG. 5) | (%) | (103) | (106) | (109) | (112) |
| EVAPORATOR D | Q [W] | 3765 | 4150 | 4567 | 4796 |
| (of FIG. 6) | (%) | (97) | (97) | (100) | (99) |
| EVAPORATOR E | Q [W] | 3961 | 4330 | 4618 | 4796 |
| (of FIG. 7) | (%) | (102) | (102) | (101) | (99) |
| Test Condition: | Dry Air: | 90° F. | | | |
| | Wet Air: | 75° F. | | | |
| | Pressure before expansion valve | 200 PSIG | | | |
| | Pressure outlet Evap. | 25 PSIG | | | |

As can be understood from the Table, evaporators B and C have higher cooling capacities than evaporator A. Other evaporators, D and E, have almost the same cooling capacity as evaporator A. Cooling capacity data of evaporators B and C shows that the outlet pipe 44 can be connected between the front and the middle portion of the outlet header 43.

According to the data comparison between evaporators B and D, the cooling capacity reduces when the inlet pipe 42 is moved toward the front side. The cooling capacity of evaporator D, when the connection is in the middle of the inlet header 41, is close to that of evaporator A.

A comparison between the data of evaporators A and D shows that the perpendicular connection of the outlet pipe 44 works as well as the prior art connection of the outlet pipe 17. As understood from the above discussion on evaporators B and C, the counter flow of the refrigerant in the evaporator may be maintained even if the outlet tube 44 is moved from the front and toward the back part of the header pipe 43.

Figure 8:
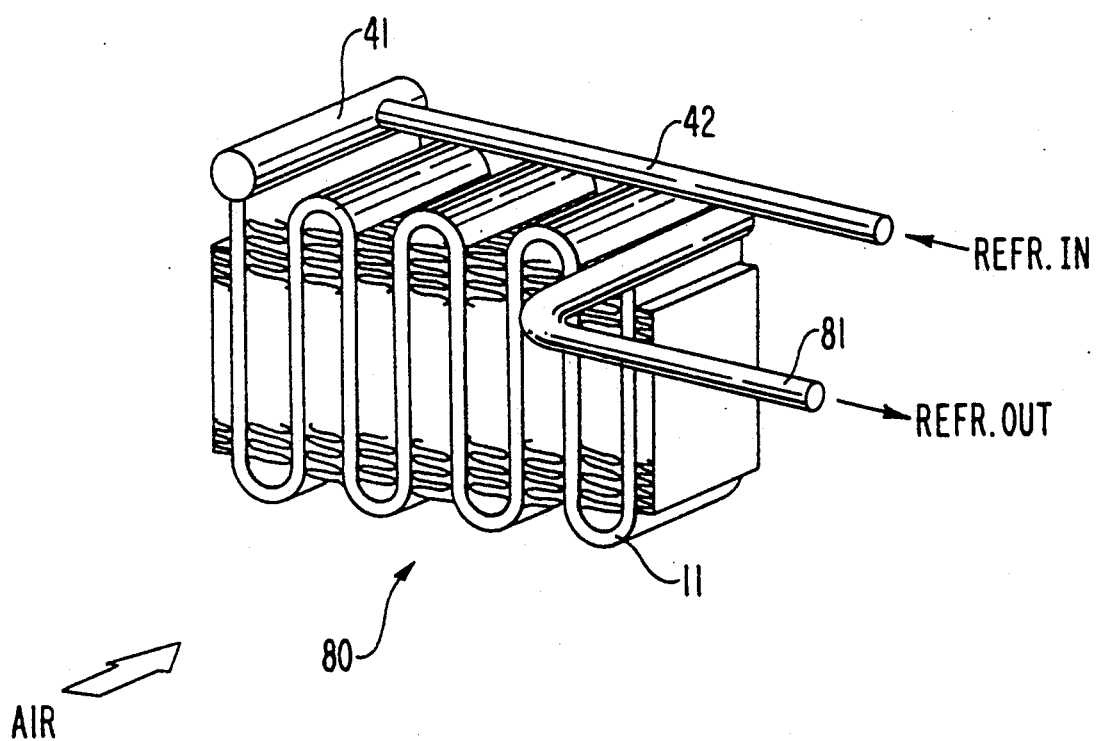

FIG. 8 is another embodiment of the present invention which shows a standard structure of an outlet pipe 81 with one end being directly brazed to an end of the flat tube 11. In this structure the rear side space in not used for piping.

Figure 9:
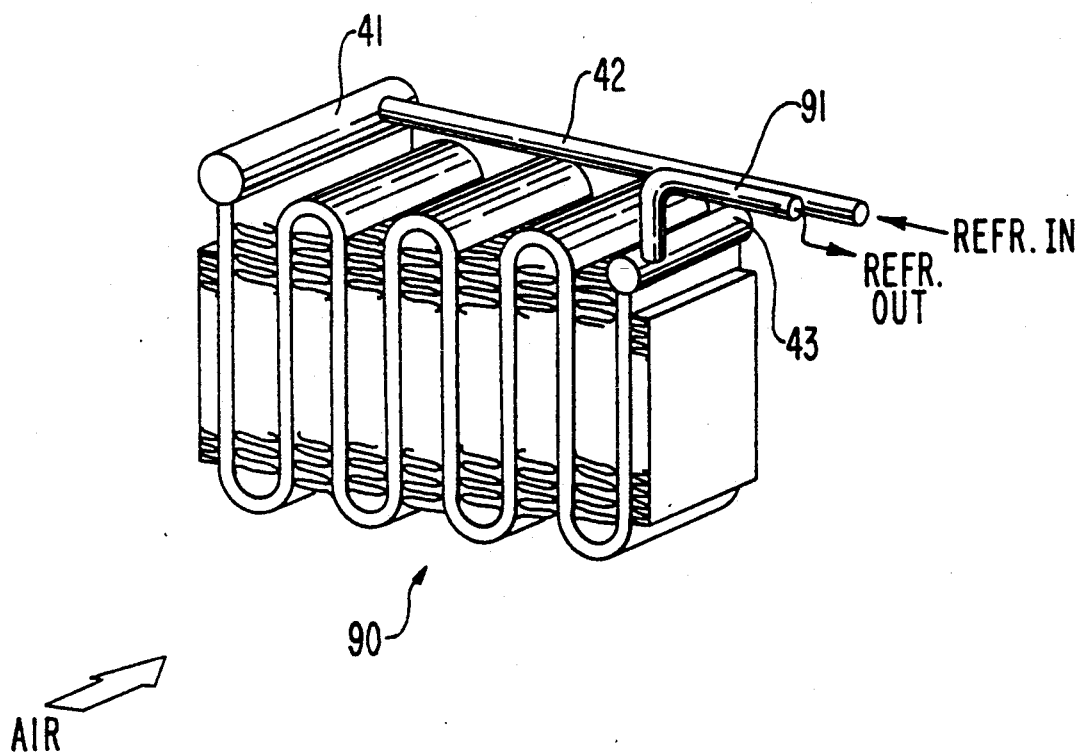

FIG. 9 is another embodiment of the evaporator 90 in which an outlet pipe 91 is connected to the outlet header pipe 43 in vertical direction in the front side thereof. However, the outlet pipe 43 can be moved to connect to the middle part of the header pipe 43, as explained above.

Figure 10:
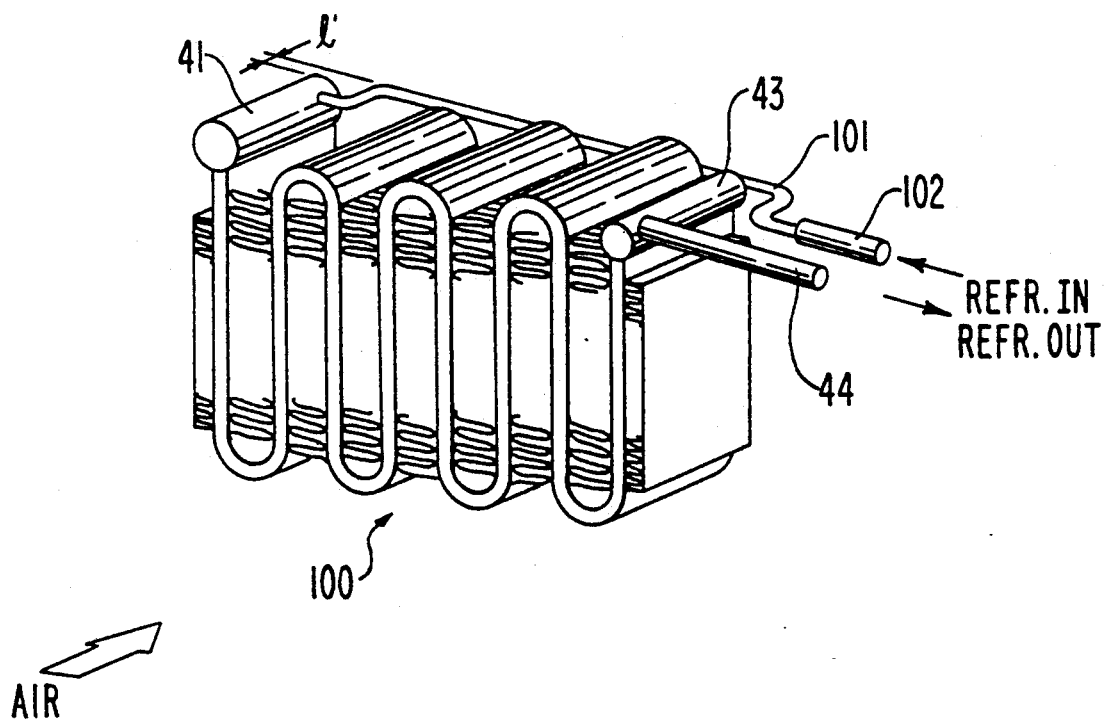

FIG. 10 is a modification of the embodiment shown in FIG. 7. Inlet pipe 101 has a smaller diameter, for example, 8 mm or 3/8 inch, than the inlet pipe 71, so that the resultant occupied space in the rear of the evaporator 100 is reduced as shown by "1'". Inlet pipe 102 has the same diameter as the inlet pipe 71.

Figure 11:
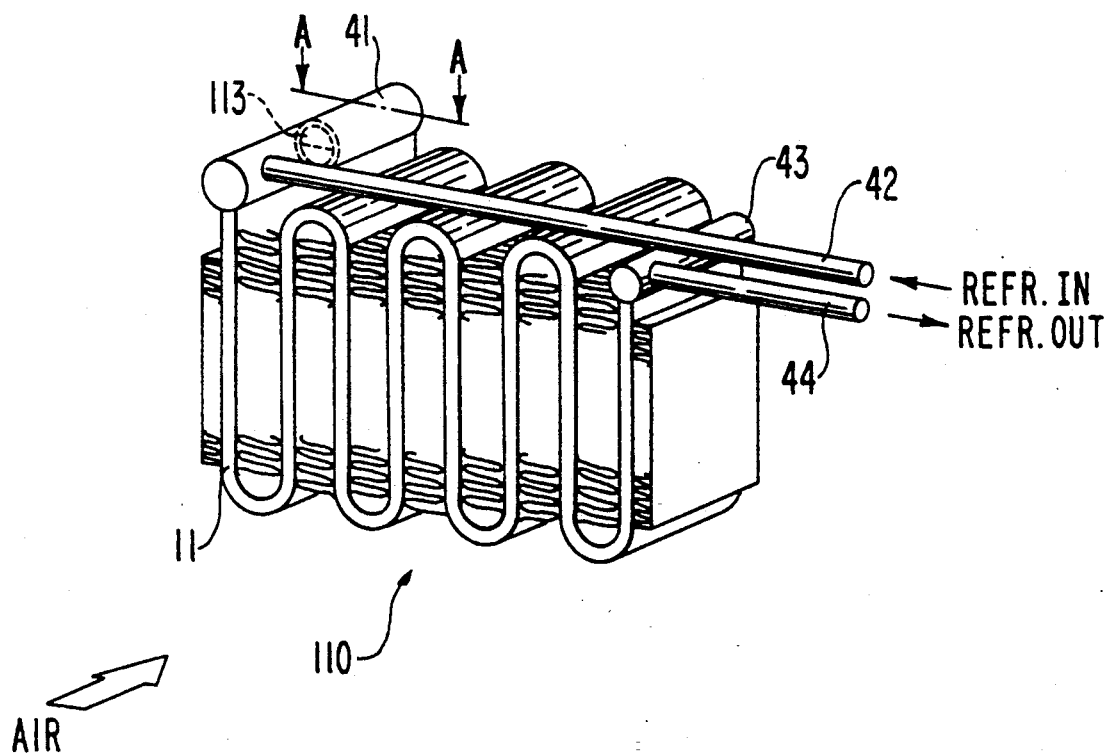
FIG. 11 is another modification of the evaporator of the present invention.

FIG. 11 shows another modification in which a flow restriction means 113 is provided to reduce the amount of fluid flowing to the back side of the inlet header 41 and to thus get a larger amount of fluid to flow in the passageways in the front side of the flat tube 11.

Figure 12:
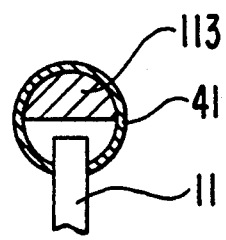
FIG. 12 shows section A—A of a flow restriction means shown in FIG. 11.

FIG. 12 shows a cross section A—A of FIG. 11. The flow restriction means 113 is inserted through a slot made on the header pipe 41. The restriction means 113 is preferably made of just an aluminum sheet which is brazed in place because the header pipe 41 is comprised of an inside cladded material. Of course, means 113 can be an aluminum cladded sheet.

The invention has been described in detail in connection with the preferred embodiments. The embodiments, however, are merely for example only and the invention is not restricted thereto. It will be understood by the skilled in the art that other variations and modifications can easily be made with the scope of this invention as defined by the appended claims.

We claim:

1. In a serpentine type evaporator for use in a refrigeration circuit, said evaporator comprising a serpentine flat tube including a plurality of spaced essentially parallel planar portions and a plurality of bent portions, fins interposed between opposed outer surfaces of said serpentine flat tube, an inlet header pipe connected to one end of said serpentine flat tube, an inlet pipe connected to said inlet header pipe, an outlet header pipe connected to the other end of said serpentine flat tube and an outlet pipe connected to said outlet header pipe, the improvement comprising at last one of said inlet pipe and said outlet pipe being connected to its corresponding header pipe in a direction both perpendicular to said inlet header pipe or said outlet header pipe to which it is attached, and in a plane parallel to the fins.

2. A serpentine type evaporator according to claim 1, wherein said inlet pipe is connected perpendicularly to said inlet header pipe at a location between the back side and the middle portion of said inlet header pipe.

3. A serpentine type evaporator according to claim 2, wherein said inlet pipe is connected in a horizontal direction to said inlet header pipe.

4. A serpentine type evaporator according to claim 2, wherein said outlet header pipe and said outlet pipe consists of one pipe that extends toward the front side of said evaporator.

5. A serpentine type evaporator according to claim 2, wherein said inlet pipe has a proximate portion connected to said inlet header pipe and which extends from the rear side of said evaporator, and wherein said proximate portion has a smaller diameter than remaining portions of said inlet tube.

6. A serpentine type evaporator according to claim 5, wherein said proximate portion of said inlet pipe has a diameter of about ⅜ inch diameter.

7. A serpentine type evaporator according to claim 5, wherein said proximate portion of said inlet pipe has a diameter of about 8 mm.

8. A serpentine type evaporator according to claim 1, wherein said outlet pipe is connected perpendicularly to said outlet header pipe at a location between the front side and the middle area of said outlet header pipe.

9. A serpentine type evaporator according to claim 8, wherein said inlet pipe is connected to one end of said inlet header pipe from the rear side of said evaporator.

10. A serpentine type evaporator according to claim 8, wherein said outlet pipe is connected perpendicularly, and in a horizontal direction, to said outlet header pipe.

11. A serpentine type evaporator according to claim 8, wherein said outlet pipe is connected perpendicularly, and in a vertical direction, to said outlet header pipe.

12. A serpentine type evaporator according to claim 1, wherein said inlet pipe is connected perpendicularly to said inlet header pipe at a location between the front side and the middle portion of said inlet header pipe, and said inlet header pipe includes a flow restriction means in the middle portion thereof to thereby restrict a larger part of fluid flow from going to the back side of said inlet header pipe than to the front side of said inlet header pipe.

* * * * *